May 23, 1961 H. A. PERKINS, JR 2,985,818

MAGNETIC AMPLIFIER SYSTEM

Filed May 9, 1957

3 Sheets-Sheet 1

WITNESSES:

Bernard R. Gieguay

Myron E. Click

INVENTOR

Harley A. Perkins, Jr.

BY

F. E. Browder

ATTORNEY

May 23, 1961

H. A. PERKINS, JR 2,985,818

MAGNETIC AMPLIFIER SYSTEM

Filed May 9, 1957

3 Sheets-Sheet 2

May 23, 1961 H. A. PERKINS, JR 2,985,818

MAGNETIC AMPLIFIER SYSTEM

Filed May 9, 1957

3 Sheets-Sheet 3

United States Patent Office 2,985,818

Patented May 23, 1961

2,985,818

MAGNETIC AMPLIFIER SYSTEM

Harley A. Perkins, Jr., Baldwin Township, Allegheny County, Pa., assignor to Westinghouse Electric Corporation, East Pittsburgh, Pa., a corporation of Pennsylvania Filed May 9, 1957, Ser. No. 658,201

10 Claims. (Cl. 323—89)

This invention relates to magnetic amplifier systems in general and, in particular, to bias supplies for magnetic amplifier systems.

In my copending application, Serial No. 640,006, entitled "Magnetic Amplifier Systems," filed February 13, 1957, a solution for the theretofore difficult task of cascading magnetic amplifier stages without the attenuation of ouput signals between stages is discussed.

In the copending application referred to above, the operation of magnetic amplifiers in general and particularly half-wave magnetic amplifiers used in digital control applications, superior performance may be obtained by the use of non-linear resistance elements instead of fixed linear resistors for coupling means. Because of the rectifier forward drop in non-linear resistance circuits, a half-wave bias supply is superior, providing non-linear resistance bias only during the active portion of a particular half-cycle. Thus, a rectifier of a non-linear resistance circuit of a magnetic amplifier's gating circuit is biased only during the gating half-cycle and a rectifier of a non-linear resistance circuit of a magnetic amplifier's reset circuit is biased only during the succeeding or reset half-cycle.

Improved operation from the magnetic amplifier may be obtained by increasing the amplitude of the reset voltage somewhat, especially where distorted reset voltages are applied as in the above-mentioned copending application. However, output loads and the gating circuit non-linear element resistor tend to increase reset exciting current requirements due to excessive induced voltage in the gating winding of the gating circuit.

An object of this invention is to provide an improved cascaded magnetic amplifier system.

Another object of this invention is to provide an improved cascaded magnetic amplifier system wherein means are included for compensating for induced voltage effects.

A further object of this invention is to provide an improved cascaded amplifier system wherein inverse voltage is applied to rectifiers avoiding large unidirectional current flow which may be deleterious to the life of some rectifiers.

Further objects of this invention will become apparent from the following description when taken in conjunction with the accompanying drawings. In said drawings, for illustrative purposes only, are shown preferred forms of the invention.

Figure 1:
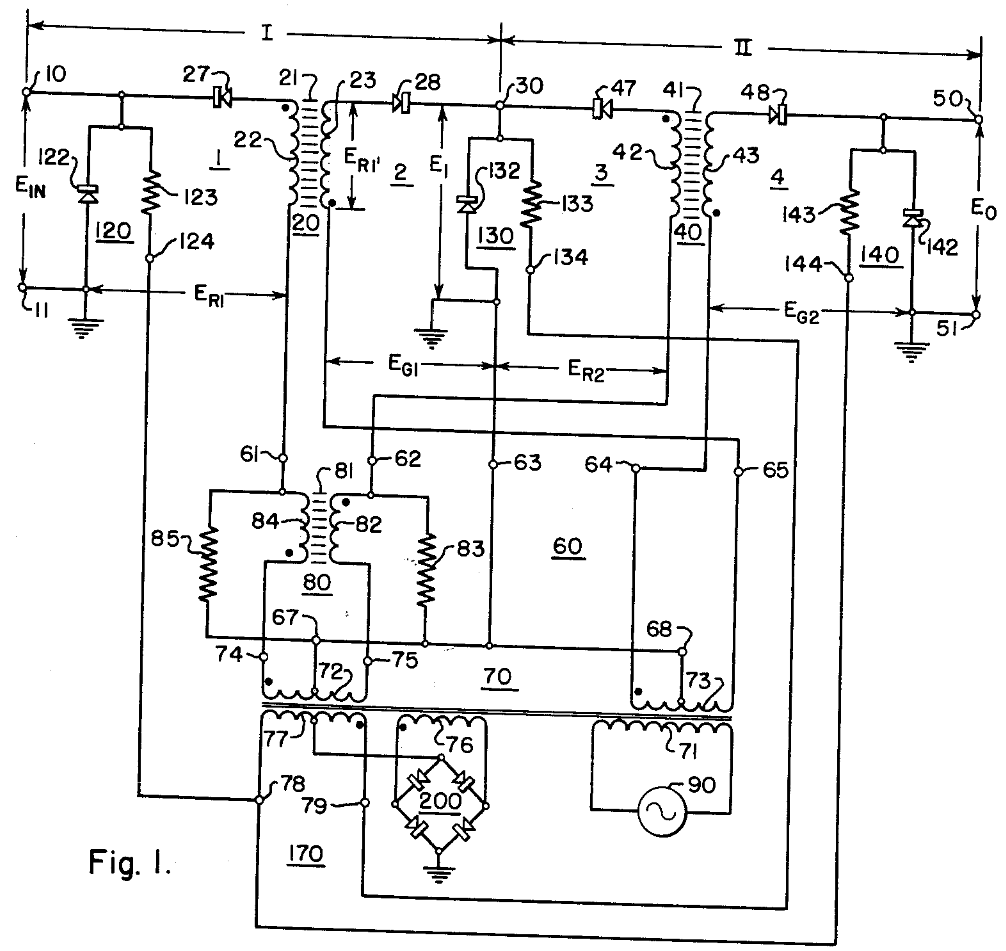
Figure 2:
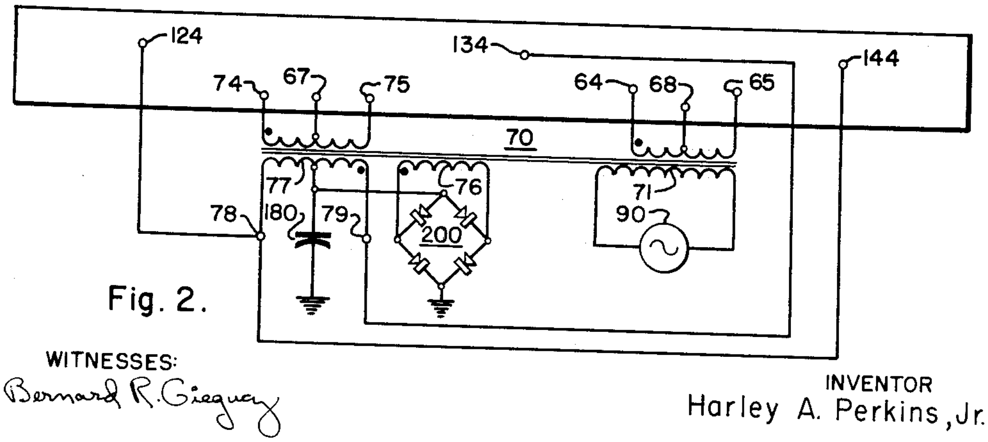
Figure 3A:
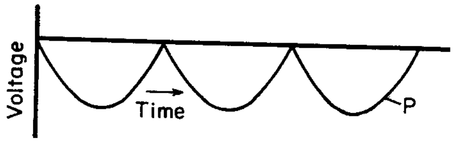
Figure 3B:
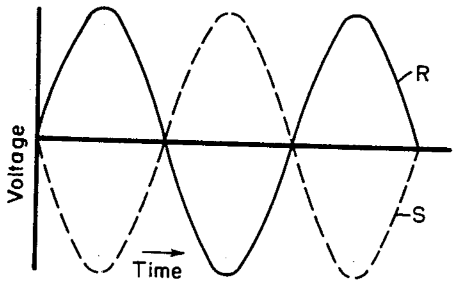
Figure 3C:
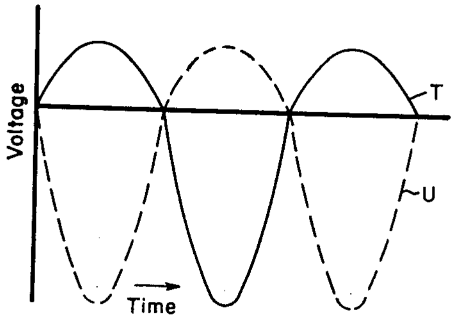
Figure 3D:
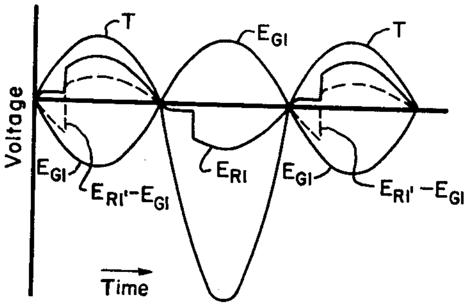
Figure 4:
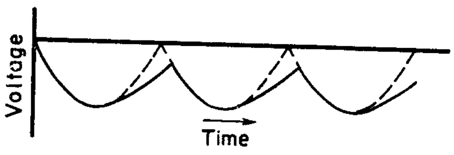
Figure 5:
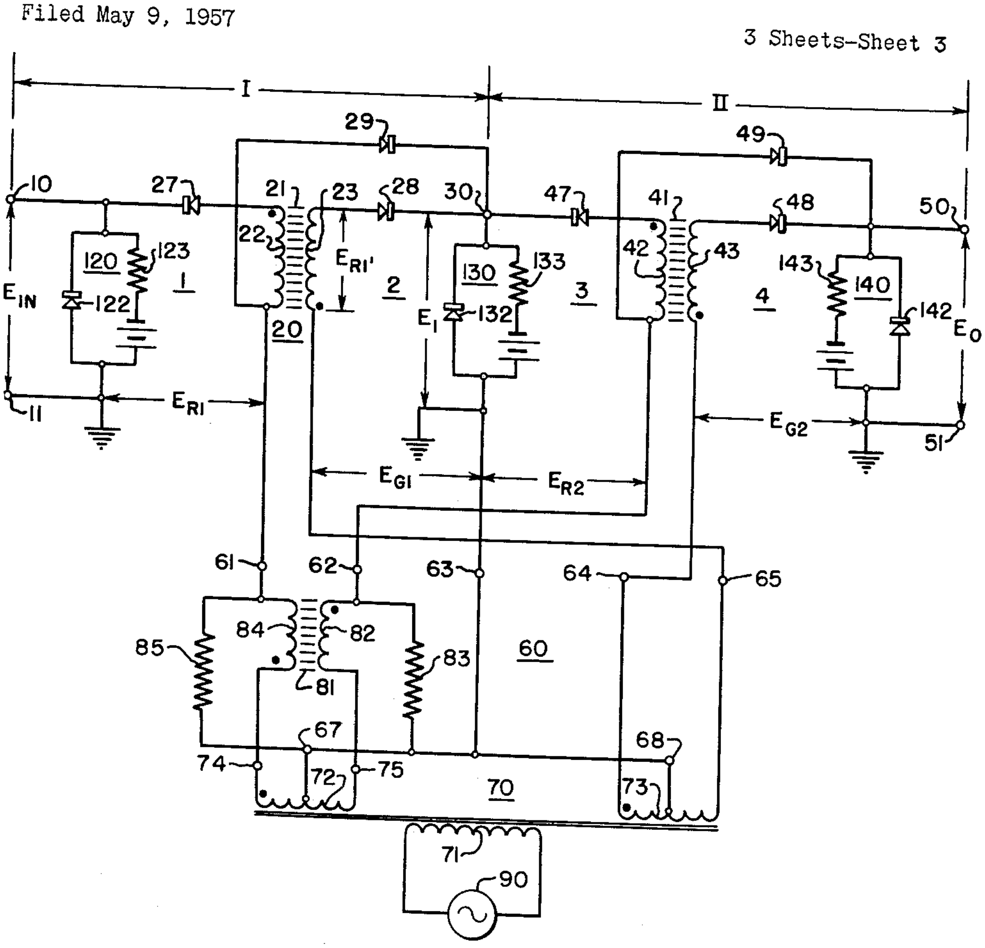

Fig. 1 is a schematic diagram of a cascaded magnetic amplifier system illustrating the teachings of this invention, Fig. 2 is a schematic diagram of a second embodiment of the invention illustrated in Fig. 1, Fig. 3*a* is a representation of wave forms present in a branch of the system shown in Fig. 1, Fig. 3*b* is a representation of wave forms present in the different branches of the system shown in Fig. 1, Fig. 3*c* is a representation of the wave forms present in the different branches of the system shown in Fig. 1, Fig. 3*d* is a representation of wave forms present in the different branches of the system shown in Fig. 1, Fig. 4 is a representation of wave forms present in the differnt branches of the system shown in Fig. 2, and Fig. 5 is a schematic diagram of a third embodiment of the invention illustrated in Fig. 1.

Referring to Fig. 1, there is illustrated two stages of a cascaded magnetic amplifier system having a common power supply. In general, the system comprises a first stage magnetic amplifier 20 having input terminals 10 and 11. The output from the magnetic amplifier 20 is connected to control a second stage magnetic amplifier 40. The output of the magnetic amplifier 40 appearing at terminals 50 and 51 constitutes the output portion of the illustrated system. The input, the stages I and II and the ouput of the magnetic amplifier system are coupled by non-linear resistance circuits 120, 130 and 140 respectively. A common power supply for the system is designated generally at 60. A common bias supply for the non-linear resistance circuits is designated generally at 170.

The first stage magnetic amplifier 20 comprises a control-reset circuit 1 and a load-ouput circuit 2. The control-reset circuit 1 includes a reset winding 22, a rectifier 27 and the non-linear resistance circuit 120 connected in series circuit relationship between a power supply terminal 61 and a suitable ground. The input signal is applied to the terminals 10 and 11 across the non-linear resistance circuit 120. The load-output circuit 2 includes a gating winding 23 and a rectifier 28 connected in series circuit relationship between a power supply terminal 65 and a terminal 30. The terminal 30 is connected to a suitable ground through the non-linear resistance circuit 130. The reset winding 22 and the gating winding 23 are disposed in inductive relationship with a magnetic core member 21.

The second stage magnetic amplifier 40 comprises a control-reset circuit 3 and a load-output circuit 4. The control-reset circuit 3 includes a reset winding 42 and a rectifier 47 connected in series-circuit relationship between a power supply terminal 62 and the terminal 30. The load-output circuit 4 includes a gating winding 43, a rectifier 48 and a non-linear resistance circuit 140 connected in series circuit relationship between a power supply terminal 64 and a suitable ground. The reset winding 42 and the gating winding 43 are disposed in inductive relationship with a magnetic core member 41. The output of the system appears across the non-linear resistance circuit 140 at the terminals 50 and 51.

The non-linear resistance circuit 120 comprises a bias source terminal 124, a resistor 123 and a rectifier 122. The non-linear resistance circuit 120 serves as a coupling between any suitable input to the system and the first stage magnetic amplifier 20. The non-linear resistance circuit 130 comprises a bias source terminal 134, a resistor 133 and a rectifier 132. The non-linear resistance circuit 130 serves as a coupling between the first stage magnetic amplifier 20 and the second stage magnetic amplifier 40. The non-linear resistance circuit 140 comprises a bias source terminal 144, a resistor 143 and a rectifier 142. The non-linear resistance circuit 140 serves as a coupling between the second stage magnetic amplifier 40 and a suitable output circuit. Reference is made to the above-mentioned copending application W.E. case No. 29,620, Serial No. 640,006, filed February 13, 1957, for an explanation of the function and operation of the non-linear resistance circuits 120, 130 and 140.

The power supply 60 is connected to a suitable alternating-current voltage source 90 through a primary winding 71 of a transformer 70. A secondary winding 73 of the transformer 70 supplies alternating-current voltage to the gating windings 23 and 43 and hence will be called the gating secondary winding. A secondary winding 72 of the transformer 70 supplies alternating-current voltage to the reset windings 22 and 42 and hence will be called the reset secondary winding.

The gating secondary winding 73 is connected to the power supply terminals 64 and 65 and has a center tap 68 which is connected to a grounded power supply terminal 63. A terminal 75 of the reset secondary winding 72 is connected through a winding 82 of a saturable reactor 80 to the power supply terminal 62. An exciting current resistor 83 is connected between a center tap 67 of the reset secondary winding 72 and the power supply terminal 62. A terminal 74 of the reset secondary winding 72 is connected through a winding 84 of the saturable reactor 80 to the power supply terminal 61. An exciting current resistor 85 is connected between the center tap 67 of the reset secondary winding 72 and the power supply terminal 61. The center tap 67 is connected to the power supply terminal 63. The windings 82 and 84 of the saturable reactor 80 are disposed in inductive relationship with a magnetic core member 81.

The bias supply source 170 for the non-linear resistance circuits 120, 130 and 140 includes a pair of secondary windings 76 and 77 of the transformer 70. One lead of the secondary winding 77 is connected to a terminal 78 which is connected to the terminals 124 and 144 of the non-linear circuits 120 and 140, respectively. The other lead of the secondary winding 77 is connected to a terminal 79 which in turn is connected to the terminal 134 of the non-linear resistance circuit 130. The secondary winding 76 is connected to a full-wave rectifier 200. The forward conducting terminal of the full-wave rectifier 200 is connected to a suitable ground and the other terminal is connected to a center tap of the secondary winding 77.

The operation of the first stage magnetic amplifier 20 can be divided into two portions, the gating portion of the supply voltage as applied to the power supply terminal 65 and thus to the gating winding 23, and the reset portion of the supply voltage as applied to the power supply terminal 61 and thus to reset winding 22. That is, during one half-cycle of supply voltage when the power supply terminal 65 is at a positive polarity with respect to ground, the gating portion of operation takes place, and during the next half-cycle when the power supply terminal 61 is at a positive polarity with respect to ground, the reset portion of operation takes place.

The operation of the second stage magnetic amplifier 40 can also be divided into two similar portions, the gating portion of the supply voltage as applied to the power supply terminal 64 and thus to the gating winding 43, and the reset portion of the supply voltage as applied to the power supply terminal 62 and thus to the reset winding 42. That is, during one half-cycle of the supply voltage when the power supply terminal 64 is at a positive polarity with respect to ground, the gating portion of operation takes place, and during the next half-cycle when the power supply terminal 62 is at a positive polarity with respect to ground, the reset portion of operation takes place.

For the proper operation of the cascaded magnetic amplifier system shown in Fig. 1, it is to be noted that the gating portion of the first stage magnetic amplifier 20 takes place on the same half-cycle of the supply voltage as the reset portion of the second stage magnetic amplifier 40 for reasons explained hereinafter.

Referring again to the first stage magnetic amplifier 20, during the gating portion of the supply voltage, when the power terminal 65 is at a positive polarity with respect to ground, exciting current flows from the terminal 65 through the gating winding 23, the rectifier 28, the terminal 30 and the non-linear resistance circuit 130 to a suitable ground. The load-output circuit 2 is designed to handle only a sufficient number of volt-seconds over the half-cycle of operation to drive magnetic core member 21 just to positive saturation. Therefore, the output across the non-linear resistance circuit 130, designated as $E_1$, during this gating half-cycle of operation would be zero.

The function of the gating rectifier 28 is two-fold, namely, to prevent a reset of the magnetic core member 21 by a reverse flow of current on the next half-cycle and to isolate the gating winding 23 of the first stage magnetic amplifier 20 from the control-reset circuit 3 of the second stage magnetic amplifier 40.

During the next half-cycle, when the power supply terminal 61 is at a positive polarity with respect to ground, exciting current flows from the terminal 61 through the reset winding 22, the rectifier 27 and the non-linear resistance circuit 120 to a suitable ground. The control-reset circuit 1 is designed to handle only a sufficient number of volt-seconds over the half-cycle of operation to drive magnetic core member 21 just to negative saturation.

The function of the reset rectifier 27 is two-fold, namely, to prevent a reverse flow of current on the next half-cycle through the reset winding 22 from presetting the flux conditions from the magnetic core member 21 and to isolate the reset winding 22 from the input circuit.

This control-reset circuit 1 will function in the above-described manner on every reset half-cycle when the power supply terminal 61 is at a positive polarity with respect to ground and there is no input signal at the terminals 10 and 11. Therefore, on succeeding alternate half-cycles, the load-output circuit 2 will consume all the volt-seconds delivered in bringing the magnetic core member 21 to positive saturation and again there will be no output $E_1$ from the first stage. However, an input signal to the terminals 10 and 11 during the reset half-cycle of the control-reset circuit 1, that is at any instant larger than the designated reset voltage $E_{R1}$, will block this reset voltage $E_{R1}$ at the rectifier 27. The control-reset circuit 1 then will not operate to desaturate the magnetic core member 21. Therefore, on the next succeeding half-cycle, the magnetic core member 21 will still be substantially completely saturated, the gating winding 23 will approximate zero impedance and an output $E_1$ will appear at the terminal 30 across the non-linear resistance circuit 130 to ground.

This output $E_1$ from the first stage magnetic amplifier 20 will continue to appear on every gating half-cycle, that is, when the power supply terminal 65 is at a positive polarity with respect to ground, as long as a signal of sufficient magnitude, to block reset voltage $E_{R1}$, is present at the input terminals 10 and 11 during the preceding reset half-cycle.

Referring now to the second stage magnetic amplifier 40, during the gating portion of supply voltage when the power supply terminal 64 is at a positive polarity with respect to ground, exciting current from the power supply terminal 64 flows through the gating winding 43, the rectifier 48 and the non-linear resistance circuit 140 to a suitable ground. The load-output circuit 4 is designed to deliver only a sufficient number of volt-seconds over the half-cycle of operation to saturate the magnetic core member 41. Therefore, the output $E_O$ across the non-linear resistance circuit 140 to the output terminals 50 and 51 during this half-cycle would be zero.

The function of the gating rectifier 48 is two-fold, namely, to prevent a reset of the magnetic core member 41 by a reverse flow of current on the next half-cycle and to isolate the gating winding 43 from the output circuit.

During the next half-cycle of supply voltage, when the power supply terminal 62 is at a positive polarity with respect to ground, exciting current from the terminal 62 flows through the reset winding 42, the rectifier 47, the terminal 30 and the non-linear resistance circuit 130 to ground. The control-reset circuit 3 is designed to deliver only a sufficient number of volt-seconds over the half-cycle of operation to desaturate the magnetic core member 41.

The function of the reset rectifier 47 is two-fold, namely, to prevent a reverse flow of current from presetting the flux conditions in the magnetic core member 41 and to isolate the reset winding 42 from the load-output circuit 2 of the magnetic amplifier 20.

The control-reset circuit 3 will function in the above-described manner on every reset half-cycle, that is, when the power supply terminal 62 is at a positive polarity with respect to ground. Therefore, on succeeding alternating half-cycles, the load-output circuit 4 will consume all the volt-seconds delivered in again bringing the magnetic core member to positive saturation and again there will be no output voltage $E_O$ at the terminals 50 and 51 across the non-linear resistance circuit 140.

It was noted above that the control-reset circuit 3 of the second stage magnetic amplifier 40 is operating on the same half-cycle of the supply voltage as the load-output circuit 2 of the first stage of the magnetic amplifier 20. Therefore, if the output voltage $E_1$ from the load-output circuit 2 of the first stage magnetic amplifier 20 appears at the terminal 30 across the non-linear resistance circuit 130, it will be of sufficient magnitude at any instant to block the reset voltage of the control-reset circuit 3, designated $E_{R2}$, at the rectifier 47. The control-reset circuit 3 then will not operate to desaturate magnetic core member 41. Accordingly, on the next succeeding half-cycle the magnetic core member 41 will still be substantially completely saturated, the gating winding 43 will approximate zero impedance and an output $E_O$ will appear at the terminals 50 and 51 across the non-linear resistance circuit 140.

A detailed discussion of the function and operation of the power supply 60 will be found in the above reference, copending application W.E. case No. 29,620, Serial No. 640,006, filed February 13, 1957.

The above-described magnetic amplifier system functions well at designed values of reset and gating voltages wherein an excessive amount of voltage is not induced in the gating winding by the reset windings on their reset half-cycle. It has been found that improved performance of the magnetic amplifier system may be obtained by increasing the amplitude of the reset voltages somewhat, especially where distorted reset voltages are applied as from the power supply 60. However, output loads and the gating circuit non-linear resistance element resistor tend to increase reset exciting current requirements due to the excessive induced voltage in the gating winding of the gating circuit from the reset winding on its reset half-cycle. In general, the number of turns on the gating winding is larger than the number of turns on the reset winding so that the output voltage is greater in magnitude than the reset voltage over nearly the entire half-cycle that the gating voltage is positive with respect to ground.

An analysis of the function and operation of the coupling non-linear resistance circuit 130 will show the problems involved and point out the features of this invention. Assume that the ratio of the number of turns on the gating winding 23 to the number of turns on the reset winding 22 of the magnetic amplifier 20 is equal to 2, as typical value. The following voltages are instantaneous values during the reset half-cycle. If the ratio of the gating voltage $E_{G1}$ to the reset voltage $E_{R1}$ is equal to 2, then the induced voltage $E_{R1}'$ in the load-output circuit minus the gating voltage $E_{G1}$ is equal to zero. But if the ratio of the gating voltage $E_{G1}$ to the reset voltage $E_{R1}$ is less than 2, then the voltage induced in the gating circuit $E_{R1}'$ will be greater than the gating voltage $E_{G1}$, leaving a surplus of voltage in the load-output circuit 2. This surplus of voltage appears across the non-linear resistance circuit 130, positive with respect to ground. Also, it is dropped across resistor 133 and the internal impedance of the bias voltage supply and any external load. The current flowing through the resistor 133 must be provided from the reset voltage source $E_{R1}$. Thus the rectifier 27 in the control-reset circuit 1 must conduct the sum of both the exciting current for the magnetic core member 21 of the magnetic amplifier 20 and the loading current reflected to the reset winding 22. The value of the loading current component is approximately:

$$\frac{E_{R1}'-E_{G1}}{R_{EQ}}\cdot\frac{N_G}{N_R}$$

where $E_{R1}'$ and $E_{G1}$ are half-wave averages instead of instantaneous values and $R_{EQ}$ is a resultant impedance presented by the resistor 133 plus the bias supply impedance and all other paralleled impedances, such as external loads.

To permit the apparent increase in exciting current to flow in the control-reset circuit 1, the bias current through the non-linear resistance circuit 120 must be increased with a consequent reduction in the possible effective gain of the amplifier. The reduction in gain results from the increased current requirements that must be present in a signal source $E_{IN}$ presented to the terminals 10 and 11.

Following is a description of the bias supply source 170 which operates in conjunction with the non-linear resistance circuits in general and, in particular, the non-linear resistance circuit 130 as hereinafter described to compensate for the induced voltage effects. There is also a feature of inverse voltage across the rectifiers in the respective non-linear resistance circuits every cycle to prevent a large unidirectional current flow.

The secondary winding 76 of the transformer 70 through the full-wave rectifier 200 supplies a negative direct current pulsating output. This output is illustrated by the wave form P in Fig. 3*a*, assuming a sinusoidal alternating-current voltage as the source 90. The secondary winding 77 of the transformer 70 supplies the wave forms illustrated by the curves R and S of Fig. 3*b*. The curve R represents the voltage present at terminal 79 with respect to ground and the curve S represents the voltage present at the terminal 78 with respect to ground. Since the output of the secondary winding 76 has been connected to the output of the secondary winding 77, the resultant wave forms are represented by the curves T and U of Fig. 3*c*. The curve T represents the addition of wave forms P and R. The curve U represents the addition of wave forms P and S.

The terminal 79 is at a positive polarity with respect to ground on a same half-cycle that the magnetic amplifier 20 is operating on its reset half-cycle. This is illustrated in Fig. 3*d* wherein $E_{G1}$ is shown as negative going when the curve T, representing the bias source supply from the terminal 79 for the non-linear resistance circuit 130, is positive going with respect to ground. The distorted reset voltage $E_{R1}$, as furnished by the power supply 60 and as discussed in the above referenced copending application, will appear across the reset winding 22 of the magnetic amplifier 20 as shown and designated in Fig. 3*d*. It will tend to induce a voltage $E_{R1}'$ in the gating winding 23 of the magnetic amplifier 20 of the same form.

As can be seen from an examination of the circuit of Fig. 1, the induced voltage $E_{R1}'$ and the gating voltage $E_{G1}$ will be opposite in polarity. Since the magnitude of the reset voltage $E_{R1}$ has been increased, then following our assumptions above of a turns ratio of 2 to 1 between the gating winding 23 and the reset winding 22, the magnitude of the $E_{R1}'$ will be approximately twice the magnitude of $E_{R1}$ shown in Fig. 1*d*. Therefore, the sum of the two voltages $E_{R1}'$ and $E_{G1}$, expressed as $(E_{R1}-E_{G1})$ in the forward conducting direction of the rectifier 28, is shown and designated in Fig. 3*d*. The resultant curve $(E_{R1}'-E_{G1})$ is positive and would show as a surplus of voltage across the non-linear resistance circuit 130 with the attendant problems as discussed hereinbefore.

However, as is shown in Fig. 3*d*, with the circuitry of the present invention the bias supply source applied to the terminal 134 of the non-linear resistance circuit 130, curve T, is larger than $(E_{R1}'-E_{G1})$ at every time during the reset half-cycle under discussion. Therefore, no current flows in the normally conducting direction through the rectifier 28 and no increase in apparent exciting current reflected to the reset circuit 22 results. The non-linear resistance circuit 120 coupling the input terminals 10 and 11 to the control-reset circuit 1 must have sufficient bias current to permit only the exciting current requirements for the magnetic core member 21 to flow in the control-reset circuit 1. This will permit a maximum effective gain for stage I of the cascaded magnetic amplifier system since the blocking input signal presented to the input terminals 10 and 11 will not have to be larger.

The positive excursions of the bias voltages provide inverse voltages for the non-linear resistance circuit rectifiers. Because significant current flow through the non-linear resistance rectifiers are only in the forward conducting directions, the bias supply is loaded only when the bias supply voltages are negative going. Thus, the bridge rectifier in the power supply tends to supply current only in its forwarding conducting direction so that the wave form of the bias supply is relatively unchanged over load variations from zero to full load.

The $N+1$ coupling non-linear resistance circuits for N stages of the cascaded magnetic amplifier system in conjunction with their modified common bias supply source will operate in the same manner as the above-described non-linear resistance circuit 130.

Referring to Fig. 2, there is illustrated another embodiment of the teachings of this invention in which like components of Figs. 1 and 2 have been given the same reference characters. The main distinction between the apparatus illustrated in Fig. 1 and Fig. 2 is that in Fig. 2 a capacitor 180 has been connected between the center tap of the secondary winding 77 of a transformer 70 and a suitable ground. Since the circuit change affected only the bias circuit 170 of Fig. 1, only the bias circuit 170 was reproduced in Fig. 2 showing the proper connecting terminals.

In general, the operation of the cascaded magnetic amplifier system illustrated in Fig. 2 is the same as the operation of the system shown in Fig. 1. However, the addition of the capacitor 180 causes the trailing edge of the pulsations illustrated in Fig. 3*a* to be extended as shown in Fig. 4. Therefore, the bias current through the non-linear resistance circuit 130, described hereinbefore, does not drop to zero immediately at the end of a gating half-cycle of the gating circuit 2 of the magnetic amplifier 20. Thus, the slightly lagging current due to the gating winding 23 inductance still finds the non-linear resistance circuit 130 biased a small value, and therefore no output voltage spike will appear at the end of a gating half-cycle.

Since the remaining operation of the apparatus illustrated in Fig. 2 is similar to that illustrated in Fig. 1, a further description of such operation is deemed unnecessary.

Referring to Fig. 5, there is illustrated another embodiment of the teachings of this invention in which like components of Figs. 1 and 5 have been given the same reference characters. The main distinction between the apparatus illustrated in Figs. 1 and 5 is that in Fig. 5 the bias supply source 170 has been omitted. In its place has been substituted suitable direct current sources for the non-linear resistance circuits 120, 130 and 140 connected between the terminals 124, 134 and 144, respectively, and a suitable ground. In addition, a rectifier 29 has been connected between the power supply terminal 61 and the terminal 30. A rectifier 49 has been connected between the power supply terminal 62 and the output terminal 50.

In general, the operation of the cascaded magnetic amplifier system illustrated in Fig. 5 is similar to the operation of the system shown in Fig. 1. However, as a solution to the problem of induced voltages in this particular circuit, a voltage has been deliberately introduced at the output terminal of each stage of such a polarity as to add to the gating supply voltage during the reset half-cycle. In the stage I the reset voltage $E_{R1}$ has been added to the gate supply voltage $E_{G1}$. In the stage II the reset voltage $E_{R2}$ has been added to the gate supply voltage $E_{G2}$. Thus, if the following relationships are maintained no sacrifice of gain occurs:

$$E_{R1}'-E_{G1}-E_{R1}\leqq 0$$

Since the remaining operation of the apparatus illustrated in Fig. 5 is similar to that of the system illustrated in Fig. 1, a further description is deemed unnecessary.

In conclusion, it is pointed out that while the illustrated examples constitute practical embodiments of my invention, I do not limit myself to the exact details shown, since modification of the same may be varied without departing from the spirit of this invention.

I claim as my invention:

1. In a magnetic amplifier system, in combination: a plurality of magnetic amplifier stages; each stage including input and output means, saturable means, load-output circuit means adapted to saturate said saturable means, and control-reset circuit means adapted to reset said saturable means; coupling means connecting the input of each successive stage to the output of the preceding stage; power supply means for supplying alternating current voltages to said load-output circuits and said control-reset circuits of said plurality of stages including saturable means whereby conduction of said alternating-current voltage in said control-reset circuit is limited to a portion of each half cycle of said alternating-current voltage; and compensating means for excessive voltages induced in said load-output circuit by said control-reset circuit of each of said plurality of magnetic amplifier stages comprising means connecting a voltage to said coupling means of a stage which blocks current flow from said induced voltage in said load-output circuit of said stages.

2. In a magnetic amplifier system, in combination: a plurality of magnetic amplifier stages each including input means, a saturable core, a gating winding, a reset winding, gating rectifier means for causing unidirectional current flow in said gating winding tending to saturate said saturable core, and reset rectifier means for causing unidirectional current flow in said reset winding tending to desaturate said saturable core; coupling means connecting the input of each successive stage to the output of the preceding stage; power supply means comprising means for supplying alternating current voltage to said gating windings and said reset windings including a saturable reactor for limiting conduction of the alternating-current voltage in said reset windings to a portion of each half cycle of the alternating current voltage; and compensating means for excessive voltages induced in the said gating windings by said reset windings of each of said plurality of magnetic amplifier stages comprising means connecting a voltage to said coupling means which blocks current flow from said induced voltage at said gating rectifier.

3. In a magnetic amplifier system, in combination: a plurality of magnetic amplifier stages each having input means, a saturable core, a gating winding, a reset winding, gating rectifier means for causing unidirectional current flow in said gating winding tending to saturate said saturable core, and reset rectifier means for causing unidirectional current flow in said reset winding tending to desaturate said saturable core; non-linear resistance means allowing current flow up to a predetermined level coupling the input of each successive stage to the output of the preceding stage; a power supply for said gating windings and for said reset windings comprising means for applying an alternating-current voltage to said windings including a saturable reactor for limiting conduction of said alternating-current voltage in said reset windings to a portion of each half-cycle; and compensating means for excessive voltages induced in the said gating windings by said reset windings of each of said plurality of magnetic amplifier stages comprising means connecting a voltage to said coupling means to block said induced voltage at said gating rectifier.

4. In a magnetic amplifier system, in combination: a plurality of magnetic amplifier stages each having input means, a saturable core, a gating winding, a reset winding, gating rectifier means for causing unidirectional current flow in said gating winding tending to saturate said saturable core, and reset rectifier means for causing unidirectional current flow in said reset winding tending to desaturate said saturable core; non-linear resistance means allowing current flow up to a predetermined level coupling the input of each successive stage to the output of the preceding stage; a power supply for said gating windings and for said reset windings comprising means for applying an alternating-current voltage to said windings including a saturable reactor for limiting conduction of said alternating-current voltage in said reset windings to a portion of each half-cycle; and compensating means for excessive voltages induced in the said gating windings by said reset windings of each of said plurality of magnetic amplifier stages; said compensating means including means providing a pulsating direct-current voltage added with an alternating-current voltage as a bias source for the said non-linear resistance means.

5. In a magnetic amplifier system, in combination: a plurality of magnetic amplifier stages each having input means, a saturable core, a gating winding, a reset winding, gating rectifier means for causing unidirectional current flow in said gating winding tending to saturate said saturable core, and reset rectifier means for causing unidirectional current flow in said reset winding tending to desaturate said saturable core; non-linear resistance means allowing current flow up to a predetermined level coupling the input of each successive stage to the output of the preceding stage; a power supply for said gating windings and for said reset windings comprising means for applying an alternating-current voltage to said windings including a saturable reactor for limiting conduction of said alternating-current voltage in said reset windings to a portion of each half-cycle; and compensating means for excessive voltages induced in the said gating windings by said reset windings of each of said plurality of magnetic amplifier stages; said compensating means including means providing a pulsating direct-current voltage, having connected thereacross a capacitive means, added with an alternating-current voltage as a bias source for the said non-linear resistance means.

6. In a magnetic amplifier system, in combination; a plurality of magnetic amplifier stages each having input means, a saturable core, a gating winding, a reset winding, gating rectifier means for causing unidirectional current flow in said gating winding tending to saturate said saturable core, and reset rectifier means for causing unidirectional current flow in said reset winding tending to desaturate said saturable core; non-linear resistance means allowing current flow up to a predetermined level coupling the input of each successive stage of the output of the preceding stage; a power supply for said gating windings and for said reset windings comprising means for applying an alternating-current voltage to said windings including a saturable reactor for limiting conduction of said alternating-current voltage in said reset windings to a portion of each half-cycle; and compensating means for excessive voltages induced in the said gating windings by said reset windings of each of said plurality of magnetic amplifier stages; said compensating means including rectifier means connecting a reset voltage of each of the said plurality of stages to block said induced voltage at said gating rectifier of the same stage.

7. In a magnetic amplifier system, in combination; a plurality of magnetic amplifier stages each having an input means, a saturable core, a gating winding, a reset winding, gating rectifier means for causing unidirectional current flow in said gating winding tending to saturate said saturable core, and reset rectifier means for causing unidirectional current flow in said reset winding tendency to deacturate said saturable core; non-linear resistance means coupling the input of each successive stage to the output of the preceding stage; said non-linear resistance means including rectifier means and means for connecting a bias source to said non-linear resistance means; said non-linear resistance means being operative to allow a reverse current flow in its rectifier up to a predetermined level; a power supply for said gating windings and for said reset windings comprising means for applying an alternating-current voltage to said gating windings and reset windings including a saturable reactor for limiting conduction of said alternating-current voltage source in said reset windings; and compensating means for excessive voltages induced in the said gating windings by said reset windings of each of said plurality of stages comprising means connecting a voltage source to said non-linear resistance means which is operative to block said induced voltage at said gating rectifier.

8. In a magnetic amplifier system, in combination; a plurality of magnetic amplifier stages each having an input means, a saturable core, a gating winding, a reset winding, gating rectifier means for causing unidirectional current flow in said gating winding tending to saturate said saturable core, and reset rectifier means for causing unidirectional current flow in said reset winding tending to desaturate said saturable core; non-linear resistance means coupling the input of each successive stage to the output of the preceding stage; said non-linear resistance means including rectifier means and means for connecting a bias source to said non-linear resistance means; said non-linear resistance means being operative to allow reverse current flow in its rectifier up to a predetermined level; a power supply for said gating windings and for said reset windings comprising means for applying an alternating-current voltage to said gating windings and reset windings including a saturable reactor for limiting conduction of said alternating-current voltage source in said reset windings; and compensating means for excessive voltages induced in the said gating windings by said reset windings of each of said plurality of stages; said compensating means including means providing a direct-current voltage added in combination with an alternating-current voltage as a bias source for said non-linear resistance means.

9. In a magnetic amplifier system, in combination; a plurality of magnetic amplifier stages each having an input means, a saturable core, gating winding, a reset winding, gating rectifier means for causing unidirectional current flow in said gating winding tending to saturate said saturable core, and reset rectifier means for causing unidirectional current flow in said reset winding tending to desaturate said saturable core; non-linear resistance means coupling the input of each successive stage to the output of the preceding stage; said non-linear resistance means including rectifier means and means for connecting a bias source to said non-linear resistance means; said non-linear resistance means being operative to allow reverse current flow in its rectifier up to a predetermined level; a power supply for said gating windings and for said reset windings comprising means for applying an alternating-current voltage to said gating windings and reset windings including a saturable reactor for limiting conduction of said alternating-current voltage source in said reset windings; and compensating means for excessive voltages induced in the said gating windings of each of said plurality of stages by said reset windings; said compensating means providing a pulsating direct-current voltage, having connected thereacross a capacitive means, added with an alternating-current voltage as a bias source for the said non-linear resistance means.

10. In a magnetic amplifier system, in combination; a plurality of magnetic amplifier stages each having an input means, a saturable core, a gating winding, a reset winding, gating rectifier means for causing unidirectional current flow in said gating winding tending to saturate said saturable core, and reset rectifier means for causing unidirectional current flow in said reset winding tending to desaturate said saturable core; non-linear resistance means coupling the input of each successive stage to the output of the preceding stage; said non-linear resistance means including a rectifier means and means for connecting a bias source to said non-linear resistance means; said non-linear resistance means being operative to allow reverse current flow in its rectifier up to a predetermined level; a power supply for said gating windings and for said reset windings comprising means for applying an alternating-current voltage to said gating windings and reset windings including a saturable reactor for limiting conduction of said alternating-current voltage source in said reset windings; and compensating means for excessive voltages induced in the said gating windings of each of said plurality of stages by the said reset windings; said compensating means including rectifier means connecting a reset voltage of each of the said plurality of stages to block said induced voltage at said gating rectifier of the same stage.

References Cited in the file of this patent

UNITED STATES PATENTS

| | | |
|---|---|---|
| 2,340,429 | Rankin | Feb. 1, 1944 |
| 2,464,639 | FitzGerald | Mar. 15, 1949 |
| 2,730,574 | Belsey | Jan. 10, 1956 |
| 2,745,056 | Zucchino | May 8, 1956 |
| 2,770,737 | Ramey | Nov. 13, 1956 |
| 2,773,235 | Malich | Dec. 4, 1956 |
| 2,780,772 | Lee | Feb. 5, 1957 |
| 2,794,173 | Ramey | May 28, 1957 |

OTHER REFERENCES

Geyger: "Magnetic Amplifier Circuits," page 157, Fig. 107, publishers, McGraw-Hill, Jan. 29, 1954.